No. 850,727. PATENTED APR. 16, 1907.
G. A. BOOZE.
FODDER CUTTER.
APPLICATION FILED DEC. 21, 1905.
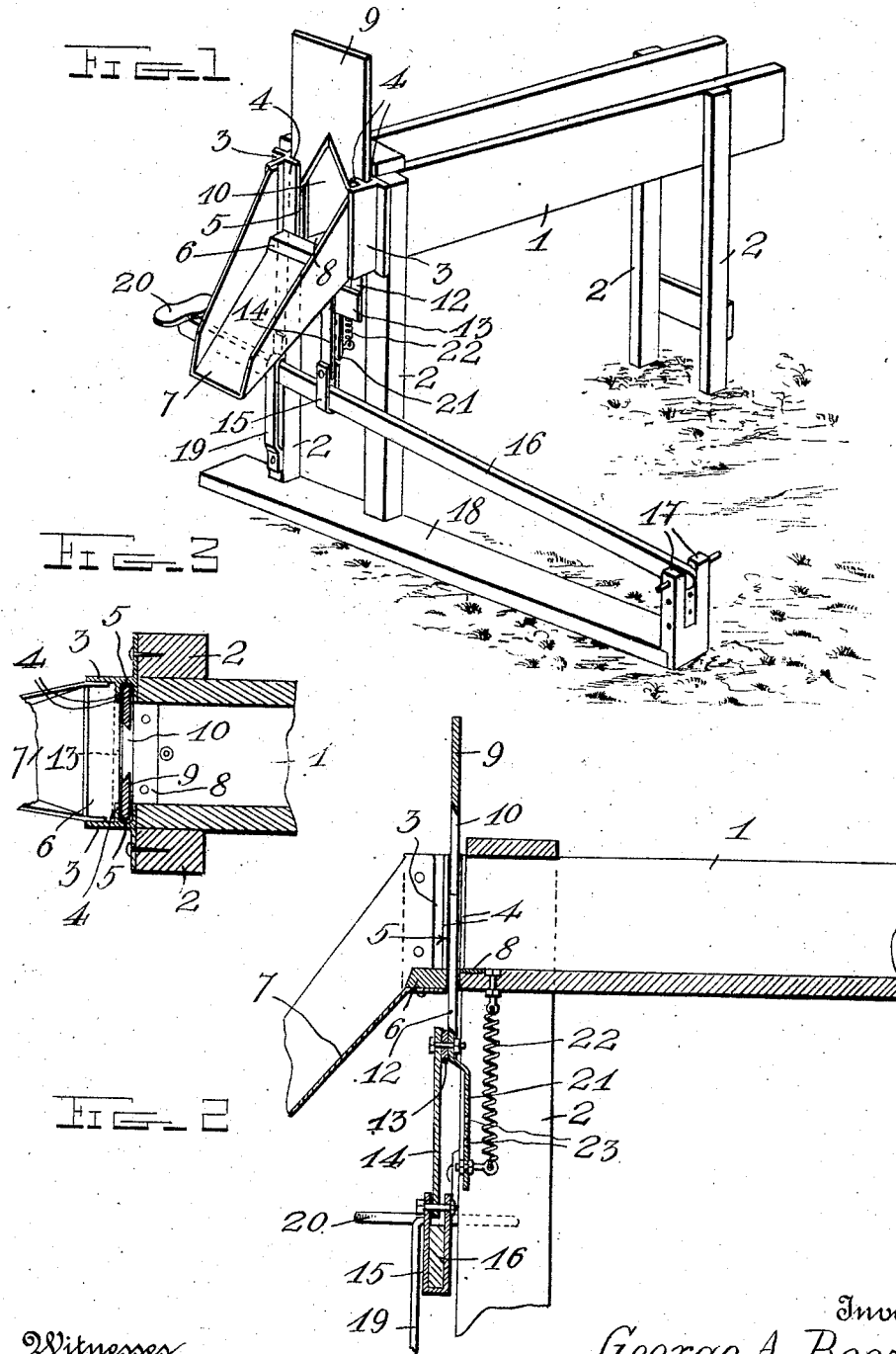
Witnesses
C. Munker
C. H. Griesbauer
Inventor
George A. Booze
by H. B. Wilson
Attorney

UNITED STATES PATENT OFFICE.

GEORGE A. BOOZE, OF STRAIGHT CREEK, KENTUCKY.

FODDER-CUTTER.

No. 850,727.  Specification of Letters Patent.  Patented April 16, 1907.

Application filed December 21, 1905. Serial No. 292,806.

*To all whom it may concern:*

Be it known that I, GEORGE A. BOOZE, a citizen of the United States, residing at Straight Creek, in the county of Bell and State of Kentucky, have invented certain new and useful Improvements in Fodder-Cutters; and I do declare the following to be a full, clear, and exact description of the invention, such as will enable others skilled in the art to which it appertains to make and use the same.

This invention relates to improvements in fodder-cutters.

The object of the invention is to provide a machine of this character by means of which straw, corn shucks and stalks, and all other varieties of fodder may be quickly and easily cut up.

A further object is to provide a fodder-cutter which will be simple, strong, durable, and inexpensive in construction, having means applied thereto whereby the cutting-blade may be conveniently reciprocated by the foot of the operator.

With the above and other objects in view the invention consists of certain novel features of construction, combination, and arrangement of parts, as will be hereinafter described and claimed.

In the accompanying drawings, Figure 1 is a perspective view of a fodder-cutter constructed in accordance with the invention. Fig. 2 is a vertical longitudinal sectional view through the hopper and cutting mechanism; and Fig. 3 is a detail horizontal sectional view through the cutting-blade, guides, and a portion of the hopper.

Referring more particularly to the drawings, 1 denotes a trough or hopper which is supported upon suitable legs 2. Adapted to be secured upon one end of the trough or hopper is a guide-frame 3, comprising vertically-disposed side plates 4, having formed therein guide passages or channels 5. The plates 4 are connected at their lower ends by a horizontally-disposed cross-bar 6, to which, if desired, may be connected a chute 7, whereby the cut fodder may be carried to a suitable receptacle or away from the operating mechanism of the machine. Secured to the bottom of the trough at the operating end thereof is a ledger-plate 8.

Slidably mounted in the guide-frame 3 is a reciprocating cutting-blade 9, said blade having formed in its lower edge a V-shaped notch 10. The edges of the latter are beveled or sharpened and are adapted to coact with the ledger-plate to cut the fodder fed over the latter from the trough or hopper. The blade 9 has formed on each side downwardly-projecting guide-bars 12, which are adapted to move in the passages or channels 5 of the guide-frame. The lower ends of the bars 12 are connected by a cross-bar 13.

Pivotally connected to the cross-bar 13 is a depending connecting bar or link 14, to the lower end of which is pivotally connected a stirrup 15, through which is adapted to project the end of an operating-lever 16. One end of the lever 16 is pivotally mounted in a bifurcated standard 17, secured to a suitable brace-bar 18. The opposite end of the lever 16 projects beyond the side of the machine and is held in place and guided in its movement by a guide-bar 19, secured to one of the legs of the machine, as shown. On the outer projecting end of the lever is arranged a treadle or foot-plate 20.

Connected to the cross-bar 13 is a depending apertured bar 21, to the lower end of which is connected the lower end of a contractile coil-spring 22, the upper end of which is connected to the bottom of the trough or hopper, as shown, whereby when the operating-lever is depressed and the knife or cutting-blade drawn downwardly to cut the fodder said parts will be raised, when said lever is released by the foot of the operator. By providing a series of apertures 23 in the bar 21 the lower end of the spring 22 may be adjustably connected thereto, thereby increasing or diminishing the tension of said spring.

While I have shown and described the coil-spring for retracting the cutting-blade, it is obvious that any other suitable form of spring may be connected and arranged to retract said blade.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claim.

Having thus described my invention, what

I claim as new, and desire to secure by Letters Patent, is—

In a fodder-cutter the combination with a trough, of a vertically-disposed guide-frame secured to one end of said hopper, a cutting-blade mounted to reciprocate in said frame and provided with downwardly-projecting guide-bars adapted to slide in said guide-frame, a cross-bar secured to the lower ends of said guide-bars, a link pivotally connected to said cross-bar and provided with a stirrup, a foot-lever passing through said stirrup and pivotally connected to a laterally-extended base, a depending bar connected to said cross-bar and having a series of vertically-spaced apertures, a coiled spring connected at one end to the bottom of the trough and having means at its other end for adjustably engaging the apertures in said depending bars.

In testimony whereof I have hereunto set my hand in presence of two subscribing witnesses.

GEORGE A. BOOZE.

Witnesses:
MASON COMBS,
ROBT. HOLLINGSINT.